US012759804B2

(12) United States Patent
Hanamoto

(10) Patent No.: US 12,759,804 B2
(45) Date of Patent: Oct. 13, 2026

(54) CONVEYANCE DEVICE

(71) Applicant: RISO KAGAKU CORPORATION, Tokyo (JP)

(72) Inventor: Yoshihiro Hanamoto, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 280 days.

(21) Appl. No.: 18/676,691

(22) Filed: May 29, 2024

(65) Prior Publication Data

US 2024/0425296 A1 Dec. 26, 2024

(30) Foreign Application Priority Data

Jun. 20, 2023 (JP) ................................ 2023-100493

(51) Int. Cl.
*B41J 2/175* (2006.01)
*B65G 43/10* (2006.01)

(52) U.S. Cl.
CPC .................................... *B65G 43/10* (2013.01)

(58) Field of Classification Search
CPC ............. B65G 43/10; B65H 7/02; B41J 29/38
See application file for complete search history.

(56) References Cited

U.S. PATENT DOCUMENTS

| | | | | |
|---|---|---|---|---|
| 9,280,117 B2 * | 3/2016 | Nakajima | G03G 15/607 |
| 10,005,293 B2 * | 6/2018 | Nishida | B65H 5/24 |
| 2011/0024965 A1 | 2/2011 | Tokoro | |
| 2015/0014915 A1 * | 1/2015 | Takahashi | B65H 29/58 271/186 |
| 2023/0125577 A1 * | 4/2023 | Hanamoto | B41J 13/0045 347/104 |

FOREIGN PATENT DOCUMENTS

| | | |
|---|---|---|
| JP | 4893837 | 3/2012 |

* cited by examiner

*Primary Examiner* — Gene O Crawford
(74) *Attorney, Agent, or Firm* — Greenblum & Bernstein, P.L.C.

(57) ABSTRACT

A conveyance device includes a processor that adjusts a conveyance condition including at least one of a feed start time of a medium by a feeder and a conveyance speed of the medium by a conveyor in a conveyance path including a processing path and a circulation path, based on a length of the medium in the conveyance direction. The processor adjusts the conveyance condition on the basis of a fact that a length of the succeeding medium conveyed to the circulation path in the conveyance direction is longer than that of the preceding medium conveyed to the circulation path, and maintains the conveyance condition of the preceding medium on the basis of a fact that the length of the succeeding medium in the conveyance direction is shorter than that of the preceding medium.

3 Claims, 6 Drawing Sheets

FIG. 5A COMPARATIVE EXAMPLE

FIG. 5B PRESENT EMBODIMENT

CONVEYANCE DEVICE

CROSS-REFERENCE TO RELATED APPLICATION

This application is based upon and claims the benefit of priority of the prior Japanese Patent Application No. 2023-100493 filed on Jun. 20, 2023, the entire contents of which are incorporated herein by reference.

FIELD

Embodiments discussed herein are related to a conveyance device that conveys a medium in a conveyance path including a circulation path.

BACKGROUND

In the related art, an image forming apparatus that feeds a recording medium at a timing when a predetermined interval is formed between a plurality of recording media so that a plurality of recording media can exist in a conveyance path on which the recording medium is conveyed when printing is performed on both sides of the recording medium is known (see, for example, Japanese Patent No. 4893837).

SUMMARY

In one aspect, a conveyance device includes a feeder that feeds a medium, a conveyor that conveys the medium in a conveyance path including a processing path for conveying the medium to a processing unit that performs processing on the medium and a circulation path for reversing the medium that has passed through the processing unit and conveying the medium to the processing unit again, and a processor that adjusts a conveyance condition including at least one of a feed start time of the medium by the feeder and a conveyance speed of the medium by the conveyor in the conveyance path based on a length of the medium in the conveyance direction, wherein the processor adjusts the conveyance condition on the basis of a fact that a length of the succeeding medium conveyed to the circulation path in the conveyance direction is longer than that of the preceding medium conveyed to the circulation path, and maintains the conveyance condition of the preceding medium on the basis of a fact that the length of the succeeding medium in the conveyance direction is shorter than that of the preceding medium.

An object and advantages of the invention will be realized and attained by means of the elements and combinations particularly pointed out in the claims.

DETAILED DESCRIPTION

Meanwhile, when printing (processing) is performed on both sides of a sheet (medium) as described above, the sheet is reversed in the circulation path. Then, the conveyance speed of the sheet in the circulation path, the number of sheets conveyed in the apparatus, and the sheet feeding timing differ depending on the sheet length (length in the conveyance direction). Therefore, in a case where a succeeding sheet having a sheet length different from that of the preceding sheet is fed, the conveyance speed and the sheet feeding timing are reset, and the succeeding sheet is fed after all the preceding sheets are ejected from the conveyance path.

Therefore, it takes a standby time until all the sheets are ejected from the conveyance path in both a case where the succeeding sheet having a sheet length longer than that of the preceding sheet is fed and a case where the succeeding sheet having a sheet length shorter than that of the preceding sheet is fed, and the conveyance efficiency (productivity) is lowered.

Hereinafter, a conveyance device according to an embodiment of the present invention will be described with reference to the drawings by exemplifying an aspect included in a printing apparatus.

Figure 1:
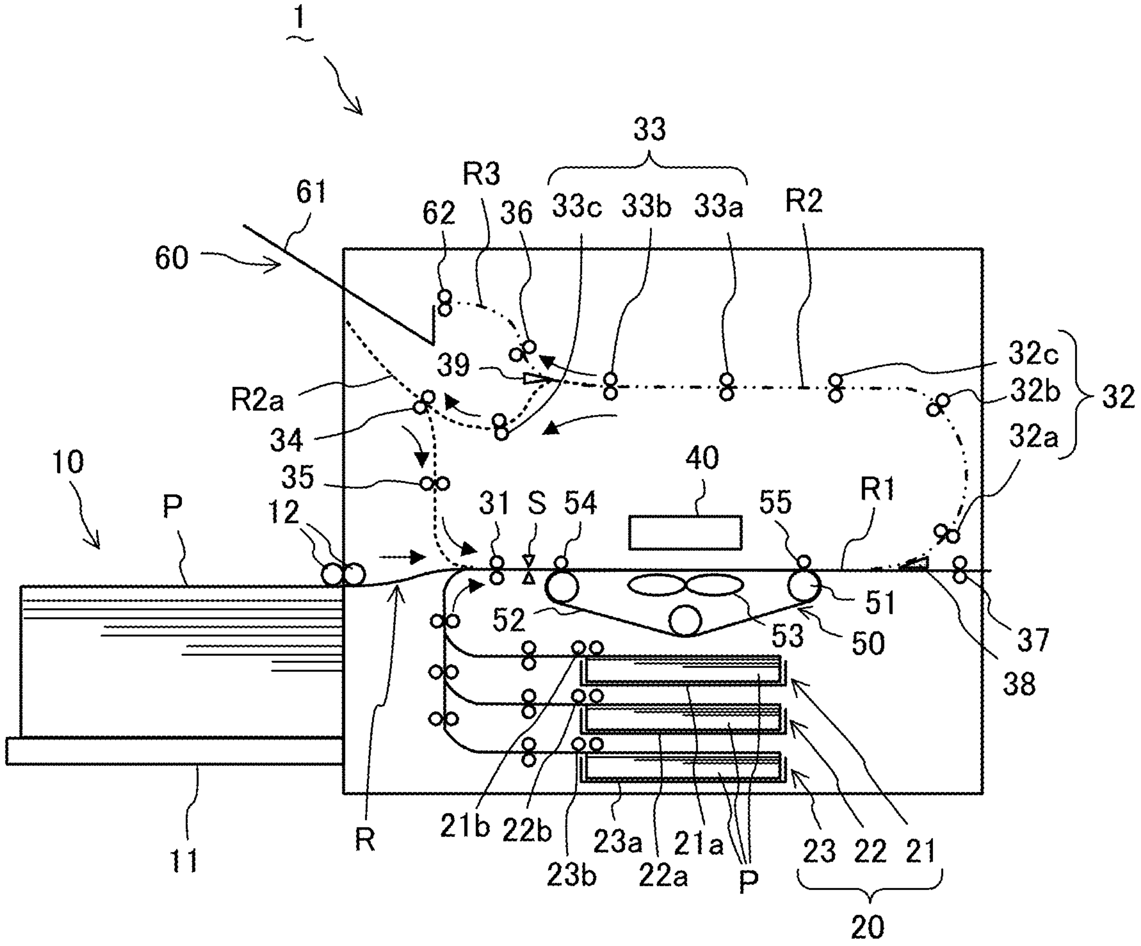
FIG. 1 is a view illustrating an internal structure of a printing apparatus in an embodiment.

FIG. 1 is a diagram illustrating an internal structure of a printing apparatus 1 according to an embodiment.

Figure 2:
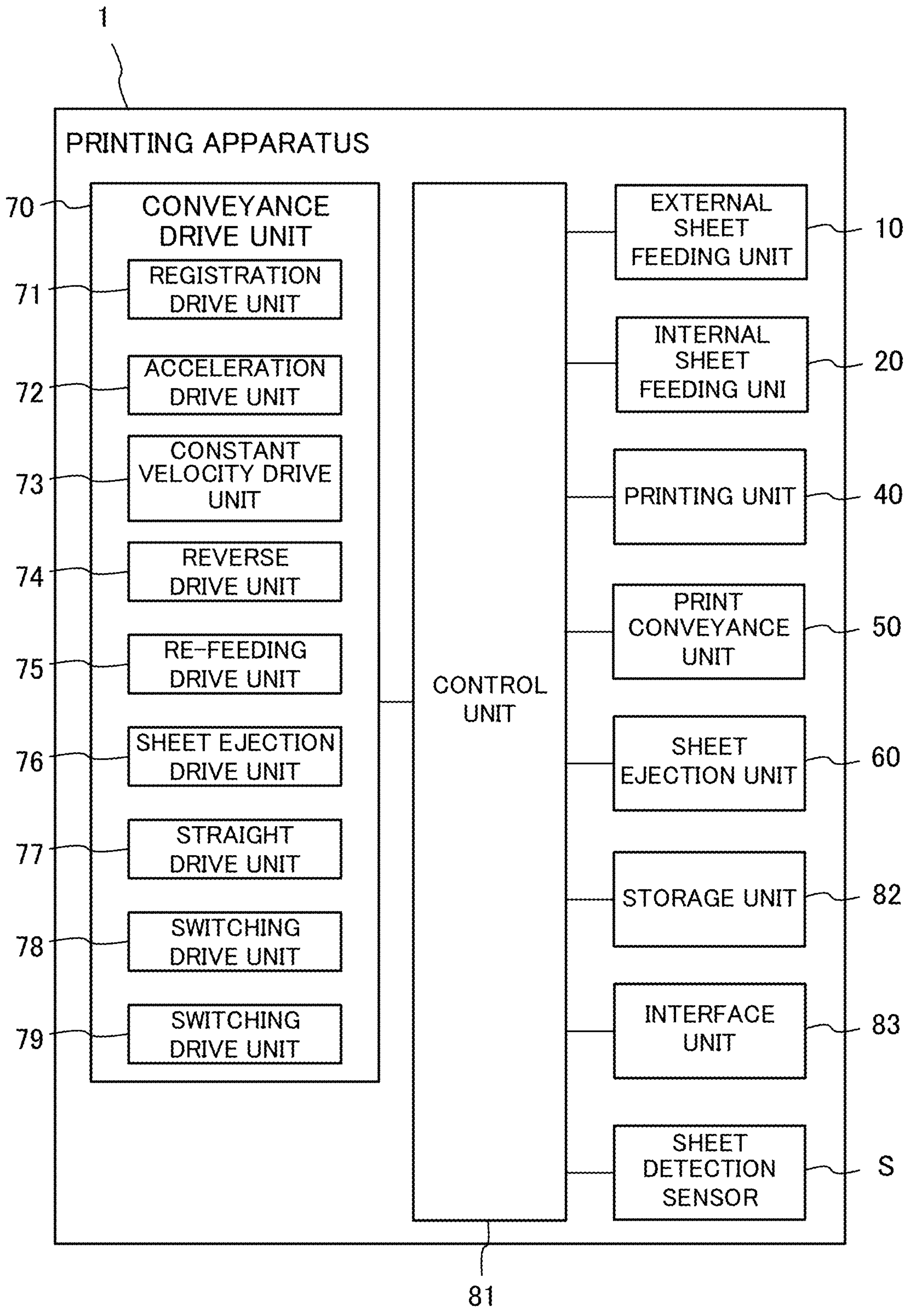
FIG. 2 is a diagram illustrating a control configuration of a printing apparatus in the embodiment.

FIG. 2 is a diagram illustrating a control configuration of the printing apparatus 1.

As illustrated in FIGS. 1 and 2, the printing apparatus 1 includes an external sheet feeding unit 10, an internal sheet feeding unit 20, a printing unit 40, a print conveyance unit 50, a sheet ejection unit 60, and a sheet detection sensor S. As illustrated in FIG. 1, the printing apparatus 1 includes a registration roller pair 31, an acceleration conveyance unit 32, a constant velocity conveyance unit 33, a reverse conveyance unit 34, a re-feeding unit 35, a sheet ejection conveyance unit 36, a straight conveyance unit 37, and path switching units 38 and 39. As illustrated in FIG. 2, the printing apparatus 1 includes a conveyance drive unit 70, a control unit 81, a storage unit 82, and an interface unit 83.

The printing apparatus 1 is an example of a processing device including a processing unit and a conveyance device, and includes a printing unit 40 as the processing unit and includes components other than the printing unit 40 in the printing apparatus 1 as the conveyance device. The processing unit may be an inspection unit that performs image inspection of the medium, a pasting unit that pastes a sticker on the medium, a drying unit that dries the medium, or the like. For example, in a case where the processing unit is an inspection unit, the processing device can be said to be an inspection device.

In FIG. 1, a processing path (printing path) R1 of the sheet P following from the external sheet feeding unit 10 or the internal sheet feeding unit 20 is indicated by a solid line, a path following from a double-sided printing circulation path R2 located above the printing unit 40 to a sheet ejection path R3 is indicated by a two-dot chain line, and a reverse path R2*a* of the circulation path R2 is indicated by a broken line. The processing path R1, the circulation path R2, and the sheet ejection path R3 constitute a conveyance path R. In other words, the conveyance path R includes the processing path R1, the circulation path R2, and the sheet ejection path R3.

The sheet P is an example of a medium. In the present specification, sheet feeding is an example of supply, and sheet ejection is an example of discharge. Therefore, the sheet feeding can be replaced with the supply, and the sheet ejection can be replaced with the discharge. The medium may be a sheet-like medium made of a material other than paper, a medium having a folded portion such as an envelope, or the like.

The external sheet feeding unit 10 is disposed to be exposed to the outside of the printing apparatus 1. The external sheet feeding unit 10 includes a sheet feeding tray 11 on which, for example, A3 size sheets P that have not been printed on are stacked, and a sheet feeding roller 12 that feeds and conveys a sheet P positioned at the top among a plurality of sheets P stacked on the sheet feeding tray 11. Although not illustrated, an actuator such as a motor that drives the sheet feeding tray 11 and the sheet feeding roller 12 is also disposed in the external sheet feeding unit 10. The sheet feeding roller 12 is an example of a conveyor, and a belt may be used instead of the roller. Note that the external sheet feeding unit 10 is an example of a feeder (supply unit) that feeds a medium (sheet P) to the processing unit (printing unit 40).

The internal sheet feeding unit 20 includes a first sheet feeding unit 21, a second sheet feeding unit 22, and a third sheet feeding unit 23. The first sheet feeding unit 21, the second sheet feeding unit 22, and the third sheet feeding unit 23 are arranged in that order from the top in the printing apparatus 1. The first sheet feeding unit 21, the second sheet feeding unit 22, and the third sheet feeding unit 23 respectively include sheet feeding trays 21*a*, 22*a*, and 23*a* on which, for example, A4 size sheets P that have not been printed on are stacked, and sheet feeding rollers 21*b*, 22*b*, and 23*b* that feed out and convey the uppermost sheet P among the plurality of sheets P stacked on the sheet feeding trays 21*a*, 22*a*, and 23*a*. Although not illustrated, an actuator such as a motor that drives the sheet feeding rollers 21*b*, 22*b*, and 23*b* is also disposed in the internal sheet feeding unit 20. The sheet feeding rollers 21*b*, 22*b*, and 23*b* are examples of conveyors, and a belt may be used instead of the rollers. Similarly to the external sheet feeding unit 10, the internal sheet feeding unit 20 is an example of a feeder that feeds a medium (sheet P) to the processing unit (printing unit 40).

The registration roller pair 31 is disposed upstream of the printing unit 40 and the print conveyance unit 50 in the conveyance direction in the processing path R1 continuing from the external sheet feeding unit 10 or the internal sheet feeding unit 20. The sheet P conveyed toward the printing unit 40 abuts against the registration roller pair 31. Accordingly, the registration roller pair 31 corrects skew feeding of the sheet P and conveys the sheet P while nipping the sheet P. The sheet detection sensor S is disposed downstream of the registration roller pair 31 in the conveyance direction and upstream of the printing unit 40 in the conveyance direction.

The acceleration conveyance unit 32 can accelerate and convey the sheet P up to the conveyance speed of the constant velocity conveyance unit 33 in the circulation path R2. The acceleration conveyance unit 32 includes acceleration roller pairs 32*a*, 32*b*, and 32*c* that convey the sheet P while nipping the sheet P. The acceleration roller pairs 32*a* and 32*b* can also be referred to as ascending conveyance rollers because the acceleration roller pairs 32*a* and 32*b* convey the sheet P upward. The acceleration roller pair 32*c* can also be referred to as a horizontal conveyance roller because the acceleration roller pair 32*c* conveys the sheet P horizontally.

The constant velocity conveyance unit 33 conveys the sheet P at a conveyance speed with a variable conveyance speed downstream in the conveyance direction of the acceleration conveyance unit 32 in the circulation path R2. The constant velocity conveyance unit 33 includes constant velocity roller pairs 33*a*, 33*b*, and 33*c* that convey the sheet P while nipping the sheet P.

The reverse conveyance unit 34 is a switchback roller pair that reverses the front and back sides of the sheet P by performing switchback conveyance while nipping the sheet P in a reverse path R2*a* provided downstream in the conveyance direction of the constant velocity conveyance unit 33 in the circulation path R2.

The re-feeding unit 35 re-feeds the reversed sheet P toward the printing unit 40 downstream in the conveyance direction of the constant velocity conveyance unit 33 in the circulation path R2. The re-feeding unit 35 decelerates and conveys the sheet P when the sheet P abuts against the registration roller pair 31.

The sheet ejection conveyance unit 36 is a sheet ejection roller pair that conveys the sheet P while nipping the sheet P toward the sheet ejection unit 60 in the sheet ejection path R3 connected to the circulation path R2 upstream in the conveyance direction with respect to the reverse path R2*a*.

The straight conveyance unit 37 is a straight roller pair that is disposed at the downstream end in the conveyance direction of the processing path R1 and conveys the sheet P while nipping the sheet P toward a coupling sheet ejection unit (not illustrated), a conveyance unit, a post-processing unit, and the like connected to the printing apparatus 1.

Note that the registration roller pair 31, the acceleration conveyance unit 32, the constant velocity conveyance unit 33, the reverse conveyance unit 34, the re-feeding unit 35, the sheet ejection conveyance unit 36, and the straight conveyance unit 37 are examples of a conveyance unit that conveys a medium (sheet P) in the conveyance path R. The conveyance unit is an example of a conveyor, and a belt may be used instead of the roller.

The path switching unit 38 switches the path of the sheet P in the processing path R1 printed by the printing unit 40 to a path continuing from the straight conveyance unit 37 to the coupling sheet ejection unit or the like and the circulation path R2. The path switching unit 38 is, for example, a flipper.

The path switching unit 39 switches the path of the sheet P conveyed in the circulation path R2 between the reverse path R2*a* and the sheet ejection path R3. The path switching unit 39 is, for example, a flipper.

The printing unit 40 includes, for example, a line head type inkjet head (not illustrated) for each color used for printing. In addition, the printing method of the printing unit 40 may be a printing method other than the inkjet printing method.

The print conveyance unit 50 is disposed to face the printing unit 40 and conveys the sheet P. The print conveyance unit 50 includes a plurality of pulleys 51, a belt 52 stretched between the pulleys 51, a suction fan 53 that sucks air through a plurality of holes provided in the belt 52 to cause the belt 52 to suck the sheet P, a guide roller 54 arranged to face the pulley 51 at the upstream end in the conveyance direction of the print conveyance unit 50, and a guide roller 55 arranged to face the pulley 51 at the downstream end in the conveyance direction of the print conveyance unit 50. Note that the print conveyance unit 50 is an example of a processing conveyance unit, and is not limited to one that conveys the sheet P while sucking the sheet P.

The sheet ejection unit 60 is disposed to be exposed to the outside of the printing apparatus 1. The sheet ejection unit 60 includes a sheet ejection tray 61 on which the printed sheet P is stacked, and a sheet ejection roller pair 62 that conveys the sheet P toward the sheet ejection tray 61.

The conveyance drive unit 70 illustrated in FIG. 2 includes a registration drive unit 71 that drives the registration roller pair 31, an acceleration drive unit 72 that drives the acceleration conveyance unit 32, a constant velocity drive unit 73 that drives the constant velocity conveyance unit 33, a reverse drive unit 74 that drives the reverse conveyance unit 34, a re-feeding drive unit 75 that drives the re-feeding unit 35, a sheet ejection drive unit 76 that drives the sheet ejection conveyance unit 36, a straight drive unit 77 that drives the straight conveyance unit 37, and switching drive units 78 and 79 that drive the path switching units 38 and 39. Each drive unit includes an actuator such as one or more motors. In addition, a single actuator may also serve as a plurality of drive units.

The control unit 81 includes a processor (for example, a central processing unit (CPU)) that functions as an arithmetic processing device that controls the operation of the entire printing apparatus 1. As will be described below in detail, the control unit 81 adjusts conveyance conditions including the sheet feeding start time of the sheet P by the external sheet feeding unit 10 and the internal sheet feeding unit 20 and the conveyance speed (particularly, the conveyance speed in the circulation path R2) of the sheet P by the conveyance unit. Note that the control unit 81 may be disposed as a device separate from the main body (for example, a conveyance unit such as the registration roller pair 31) of the printing apparatus 1, and may control the feeder (the external sheet feeding unit 10 and the internal sheet feeding unit 20) and the conveyance unit, for example, in a wireless manner via network. Even in this case, it can be said that the conveyance device with the printing apparatus 1 as an example includes the feeder (the external sheet feeding unit 10 and the internal sheet feeding unit 20), the conveyor, and the processor (the control unit 81).

The storage unit 82 includes, for example, a memory such as a read only memory (ROM) that is a read-only semiconductor memory in which a predetermined control program is recorded in advance, a random access memory (RAM) that is a semiconductor memory that is used as a working storage area as necessary when the processor executes various control programs and is writable and readable at any time, a hard disk device, and the like.

The interface unit 83 exchanges various kinds of information with an external device. For example, the interface unit 83 receives a print job including image data from a user terminal.

Next, a normal printing operation in the printing apparatus I will be described.

When a print job is input, the control unit 81 illustrated in FIG. 2 performs sheet feeding reservation processing and sheet feed processing of the sheet P. Furthermore, the control unit 81 controls the conveyance unit such as the registration roller pair 31 to convey the sheet P. In addition, the control unit 81 controls the printing unit 40 to perform printing on the sheet P after performing predetermined image processing on the image data included in the print job.

Here, in a case of single-sided printing, as illustrated in FIG. 1, an unprinted sheet P is sequentially fed from any of the external sheet feeding unit 10, the first sheet feeding unit 21, the second sheet feeding unit 22, and the third sheet feeding unit 23, and is sequentially fed at a timing at which each sheet P is conveyed at a predetermined sheet interval in the print conveyance unit 50. The fed sheet P is printed by the printing unit 40 while being conveyed at a predetermined conveyance speed in the print conveyance unit 50. The printed sheet P is ejected from the sheet ejection unit 60 or the coupling sheet ejection unit.

In a case where the sheet ejection destination is the coupling sheet ejection unit, the path of the printed sheet P is set, by the path switching unit 38, to a path passing through the straight conveyance unit 37 without changing. Then, the sheet P is ejected to the coupling sheet ejection unit by the straight conveyance unit 37. On the other hand, in a case where the sheet ejection destination is the sheet ejection unit 60, the path of the printed sheet P is guided to the circulation path R2 by the path switching unit 38 and guided to the sheet ejection path R3 by the path switching unit 39. Then, the sheet P is ejected to the sheet ejection unit 60 by the sheet ejection conveyance unit 36.

In a case of double-sided printing, for example, unprinted sheets P are sequentially fed at a timing when the time between the sheet feeding timings of the respective sheets P is twice the sheet feeding timing at the time of single-sided printing. The fed sheet P is conveyed by the print conveyance unit 50 and is printed by the printing unit 40 as in the case of single-sided printing.

The sheet P after single-sided printing is guided to the circulation path R2 for double-sided printing by the path switching unit 38, conveyed by the acceleration conveyance unit 32 and the constant velocity conveyance unit 33, and then conveyed to the reverse path R2a by the path switching unit 39. The sheet P that has reached the reverse conveyance unit 34 is switched back.

Next, the sheet P is conveyed to the registration roller pair 31 by the re-feeding unit 35. Then, the skew feeding of the sheet P is corrected by the registration roller pair 31 as described above, and then the sheet P is re-fed to the printing unit 40.

As an example, the single-sided printed sheet P is re-fed at such timing alternately with the unprinted sheet P that is sequentially fed to the printing unit 40. In the above-described example, in double-sided printing, the time between the sheet feeding timings of the respective sheets P is twice the sheet feeding timing in the case of single-sided printing. Therefore, it is possible to insert the single-sided printed sheet P between the unprinted sheets P and re-feed the single-sided printed sheet P alternately with feeding of the unprinted sheet P.

The single-sided printed sheet P is switched back by the reverse conveyance unit 34 and then sent to the printing unit 40 with the non-printed surface facing upward. The single-sided printed sheet P is conveyed by the print conveyance unit 50, and printing is performed on an unprinted surface by the printing unit 40. Then, the double-sided printed sheet P is ejected to the sheet ejection unit 60 or the coupling sheet ejection unit.

Hereinafter, adjustment of the conveyance condition of the sheet P will be described with reference to FIGS. 3 to 6. The preceding sheet P and the subsequent sheet P are sheets P to be subjected to double-sided printing, and are conveyed to the circulation path R2.

Figure 3:
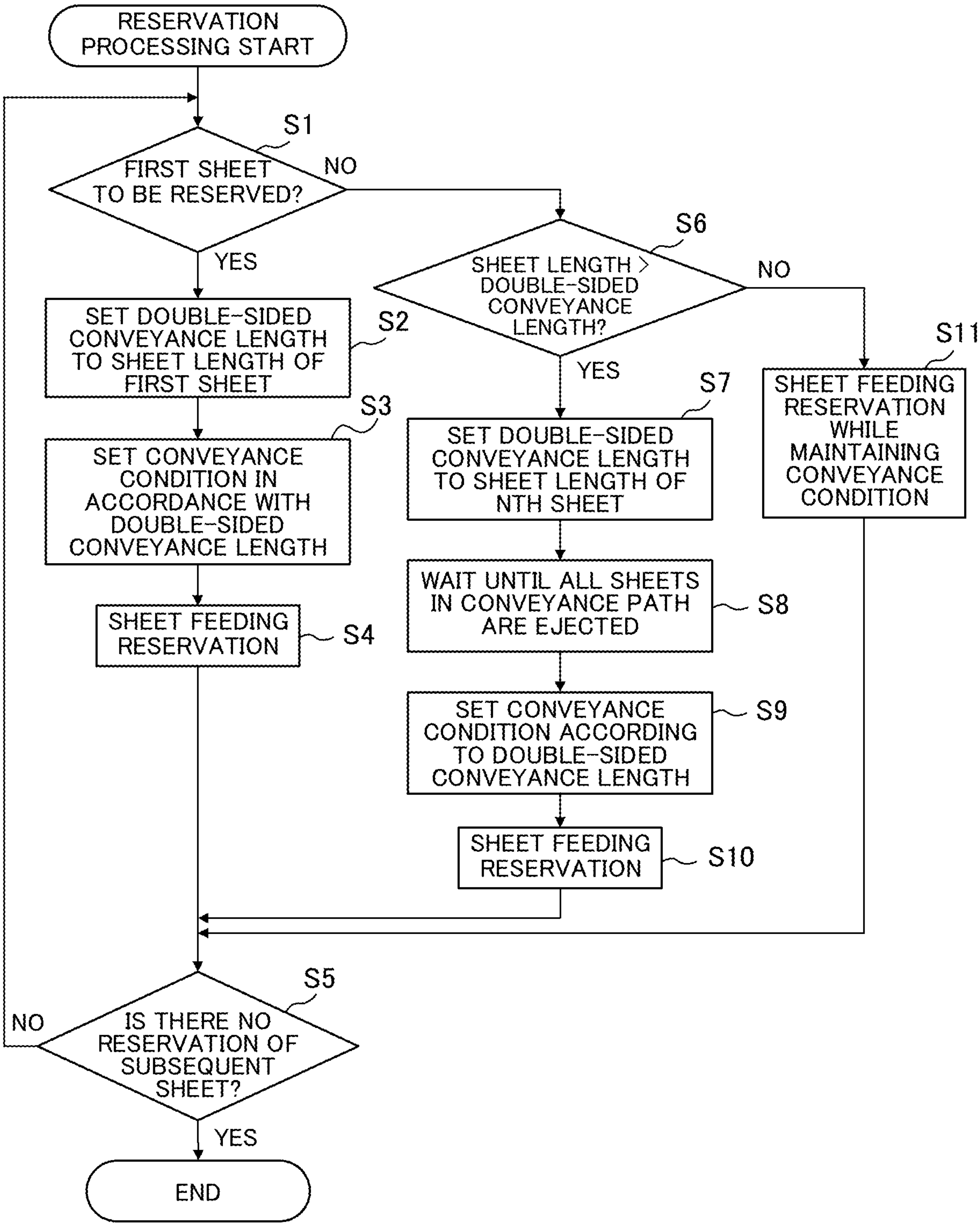
FIG. 3 is a flowchart for explaining sheet feeding reservation processing according to the embodiment.

FIG. 3 is a flowchart for explaining a sheet feeding reservation processing. The flowchart illustrated in FIG. 3 is performed by the control unit 81, for example, when the interface unit 83 illustrated in FIG. 2 receives a print job including double-sided printing. Further, in the example of FIGS. 5A and 5B, in the print job, two copies of double-sided printing of three sheets of the first A4 size sheet, the second A4 size sheet, and the third A3 size sheet are performed (the fourth A4 size sheet, the fifth A4 size sheet, and the sixth A3 size sheet), and the sheet feeding reservation and the sheet feeding of a total of six sheets P are performed. Further, in the present embodiment, the A4 size sheet P is conveyed in a lateral direction whose longitudinal direction is orthogonal to the conveyance direction, and the A3 size sheet P is conveyed in a longitudinal direction whose longitudinal direction is parallel to the conveyance direction.

As illustrated in FIG. 3, first, the control unit 81 determines whether the sheet P to be reserved for feeding is the first sheet to be reserved (step S1).

If the sheet P is reserved as the first sheet (step S1: YES), the control unit 81 sets the "double-sided conveyance length" to the sheet length (length in the conveyance direction) of the first sheet P (step S2). Then, the control unit 81 sets a corresponding specified conveyance condition in accordance with the double-sided conveyance length (step S3), and performs sheet feeding reservation (step S4). Note that the conveyance conditions are, for example, a sheet feeding start time of the external sheet feeding unit 10 or the internal sheet feeding unit 20, and a conveyance speed of the constant velocity conveyance unit 33 (circulation path R2). Furthermore, the sheet feeding reservation is, for example, processing inside the control unit 81, and can be said to be processing of scheduling subsequent sheet feeding processing in advance.

Next, the control unit 81 determines whether there is no reservation of the subsequent sheet P (step S5), and if there is no subsequent sheet P (step S5: YES), the processing illustrated in FIG. 3 ends. On the other hand, if there is a subsequent sheet P (step S5: NO), the processing is repeated from the processing in step S1 described above.

In the processing of step S1 described above, when the sheet P to be reserved for feeding is not the first sheet to be reserved (step S1: NO), the control unit 81 determines whether the sheet length of the sheet P (Nth sheet) to be reserved for feeding is longer than the double-sided conveyance length (sheet length of preceding sheet P) set as described above (step S6).

When the sheet length of the subsequent sheet P is longer than the double-sided conveyance length (step S6: YES), the control unit 81 sets the double-sided conveyance length to the sheet length of the subsequent (Nth) sheet P (step S7).

Then, the control unit 81 waits until all the sheets P in the conveyance path R are ejected (step S8). For example, in both the comparative example of FIG. 5A and the present embodiment of FIG. 5B, the sheet feeding reservation of the third A3 size sheet P (A3(3)) having a sheet length longer than that of the second A4 size sheet P (A4(2)) is not performed immediately at the stage of the downward dotted arrow, but the sheet feeding reservation (downward solid arrow) is performed after waiting until all the sheets P inside the conveyance path R are ejected. Note that whether or not all the sheets P have been ejected may be determined by detecting that all the sheets P have been ejected using a sheet detection sensor (not illustrated) in the vicinity of the sheet ejection conveyance unit 36 or in the vicinity of the straight conveyance unit 37.

Then, the control unit 81 sets the conveyance condition according to the double-sided conveyance length (step S9), and performs sheet feeding reservation (step S10). Thereafter, the control unit 81 performs the processing of step S5 described above, that is, the determination processing as to whether there is no subsequent reservation of the sheet P.

In the processing of step S6 described above, in a case where the sheet length of the subsequent sheet P is not longer than the double-sided conveyance length (step S6: NO), that is, in a case where the sheet length of the subsequent sheet P is shorter than or equal to the sheet length of the preceding sheet P, the control unit 81 performs sheet feeding reservation while maintaining the conveyance condition (step S11). Thereafter, the control unit 81 performs the processing of step S5 described above, that is, the determination processing as to whether there is no subsequent reservation of the sheet P.

As described above, even in a case where the sheet length of the subsequent sheet P is shorter than the sheet length of the preceding sheet P, by maintaining the conveyance condition, as in the example of the present embodiment of FIG. 5B, the sheet feeding (upward solid line arrow) of the fourth A4 size sheet P (A4(4)) having a sheet length shorter than that of the third A3 size sheet P (A3(3)) is performed at the sheet feeding interval of A3 size sheet.

On the other hand, as in the comparative example of FIG. 5A, when the sheet feeding interval is changed to the A4 size sheet by waiting until all the sheets P in the conveyance path R are ejected as described above before performing the sheet feeding reservation of the fourth A4 size sheet P (A4(4)) having a shorter sheet length than the third A3 size sheet P (A3(3)), the sheet feeding is delayed by that amount.

Furthermore, in the comparative example of FIG. 5A, before performing the sheet feeding reservation of the sixth A3 size sheet P (A3(6)) having a sheet length longer than that of the fifth A4 size sheet P (A4(5)), the sheet feeding interval is changed to the A3 size sheet by waiting again until all the sheets P in the conveyance path R are ejected. In this regard, in the present embodiment of FIG. 5B, the sheet feeding interval of the fourth and fifth A4 size sheets P (A4(4) and A4(5)) is the A3 size sheet feeding interval even when the sheet feeding reservation of the sixth A3 size sheet P (A3(6)) having a longer sheet length than the fifth A4 size sheet P (A4(5)) is performed. Therefore, even when the sheet feeding reservation of the sixth A3 size sheet P (A3(6)) is performed, the processing of waiting until all the sheets P in the conveyance path R are ejected can be avoided.

As a result, in the present embodiment, as compared with the comparative example, the sheet feeding start time of the sixth A3 size sheet P (A3(6)) fed last becomes earlier, and the printing (processing) completion time can be shortened. In other words, productivity (conveyance efficiency) is improved.

Next, sheet feed processing performed by the control unit 81 when the sheet P is actually fed from the external sheet feeding unit 10 or the internal sheet feeding unit 20 will be described with reference to the flowchart of FIG. 4.

Figure 4:
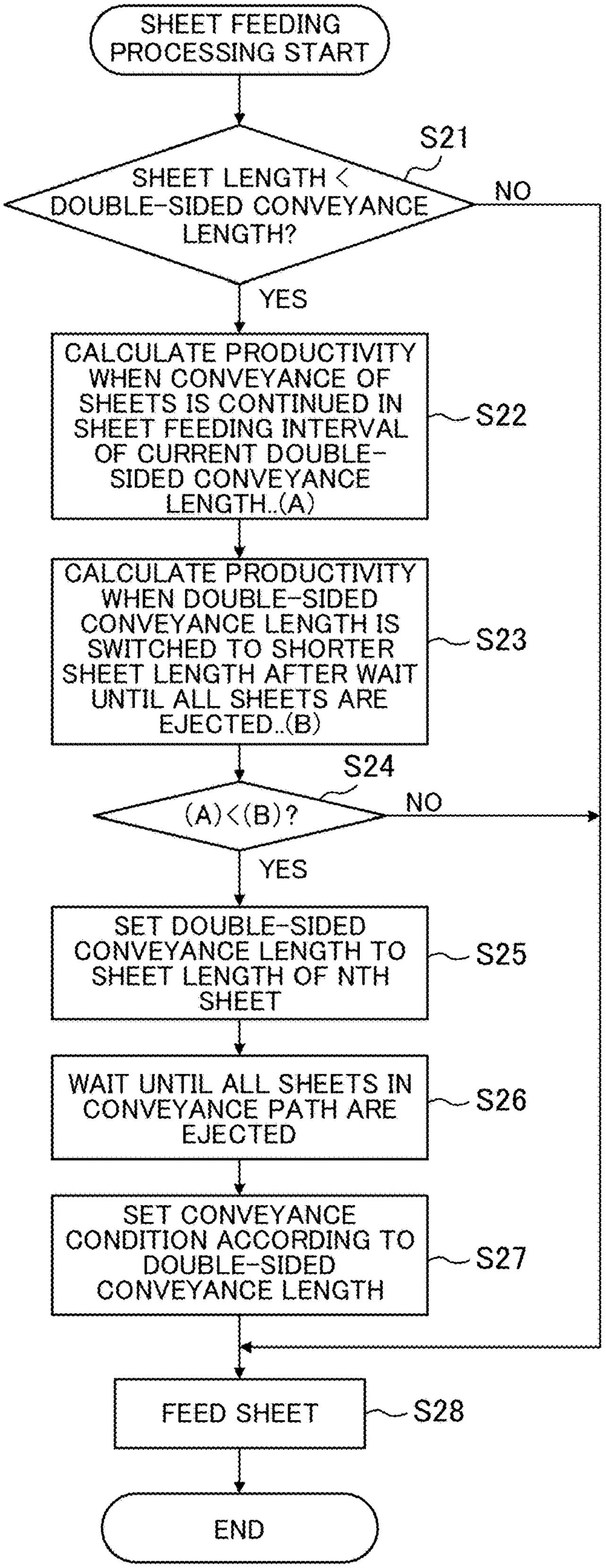
FIG. 4 is a flowchart for explaining sheet feed processing according to the embodiment.

As illustrated in FIG. 4, first, the control unit 81 determines whether the sheet length of the sheet P to be fed (Nth sheet) is shorter than the double-sided conveyance length (step S21).

When the sheet length of the subsequent sheet P is longer than or equal to the double-sided conveyance length (step S21: NO), the control unit 81 controls the external sheet feeding unit 10 or the internal sheet feeding unit 20 to feed the sheet P under the conveyance condition determined in the sheet feeding reservation processing of FIG. 3 described above (step S28), and ends the process illustrated in FIG. 4.

On the other hand, when the sheet length of the subsequent sheet P is shorter than the double-sided conveyance length (step S21: YES), the control unit 81 calculates the productivity A in a case where the conveyance of the plurality of subsequent sheets P is continued in the sheet feeding interval time of the current double-sided conveyance length (step S22). As the productivity A, for example, a sheet feeding start time of the last sheet P for which sheet feeding is reserved may be calculated as at least a sheet feeding start time in a case where a plurality of subsequent sheets P are conveyed. It can be determined that the productivity is higher as the sheet feeding start time is earlier.

Further, the control unit 81 calculates the productivity B in a case where the double-sided conveyance length is switched to the sheet length of the subsequent short sheet P after waiting until all the sheets P in the conveyance path R are ejected (step S23). In this productivity B, similarly to the productivity A, for example, the sheet feeding start time of the last sheet P for which sheet feeding is reserved may be calculated as at least the sheet feeding start time in a case where the plurality of subsequent sheets P are conveyed.

Then, the control unit 81 compares the productivity A with the productivity B and determines whether the productivity B is higher than the productivity A (step S24). For example, the control unit 81 determines which of the sheet feeding start times of the last sheet P for which sheet feeding is reserved is earlier and determines that the productivity is high if the sheet feeding start time is earlier.

When the productivity B is not higher than the productivity A (step S24: NO), the control unit 81 controls the external sheet feeding unit 10 or the internal sheet feeding unit 20 to feed the sheet P under the conveyance condition determined in the sheet feeding reservation processing of FIG. 3 described above (step S28), and ends the process illustrated in FIG. 4.

When the productivity B is higher than the productivity A (step S24: YES), the control unit 81 sets the double-sided conveyance length to the sheet length of the Nth sheet (step S25). Then, the control unit 81 waits until all the sheets P in the conveyance path R are ejected (step S26), and sets the conveyance condition in accordance with the double-sided conveyance length (step S27). Thereafter, the control unit 81 controls the external sheet feeding unit 10 or the internal sheet feeding unit 20 to feed the sheet P (step S28), and ends the processing illustrated in FIG. 4.

Figure 5:
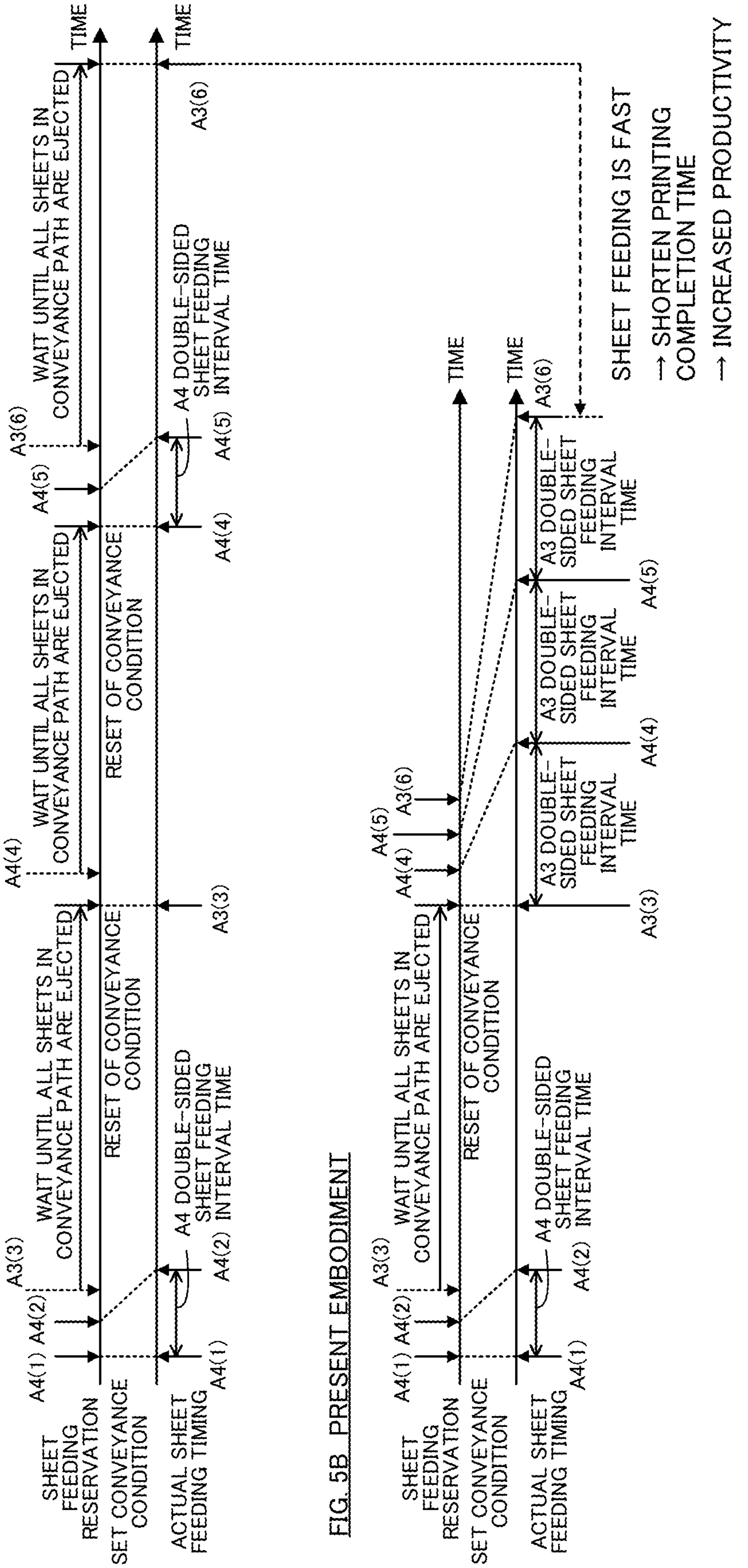
FIGS. 5A and 5B are diagrams for explaining a difference in sheet feeding start time between a comparative example (A) and the embodiment (B)
Figure 6:
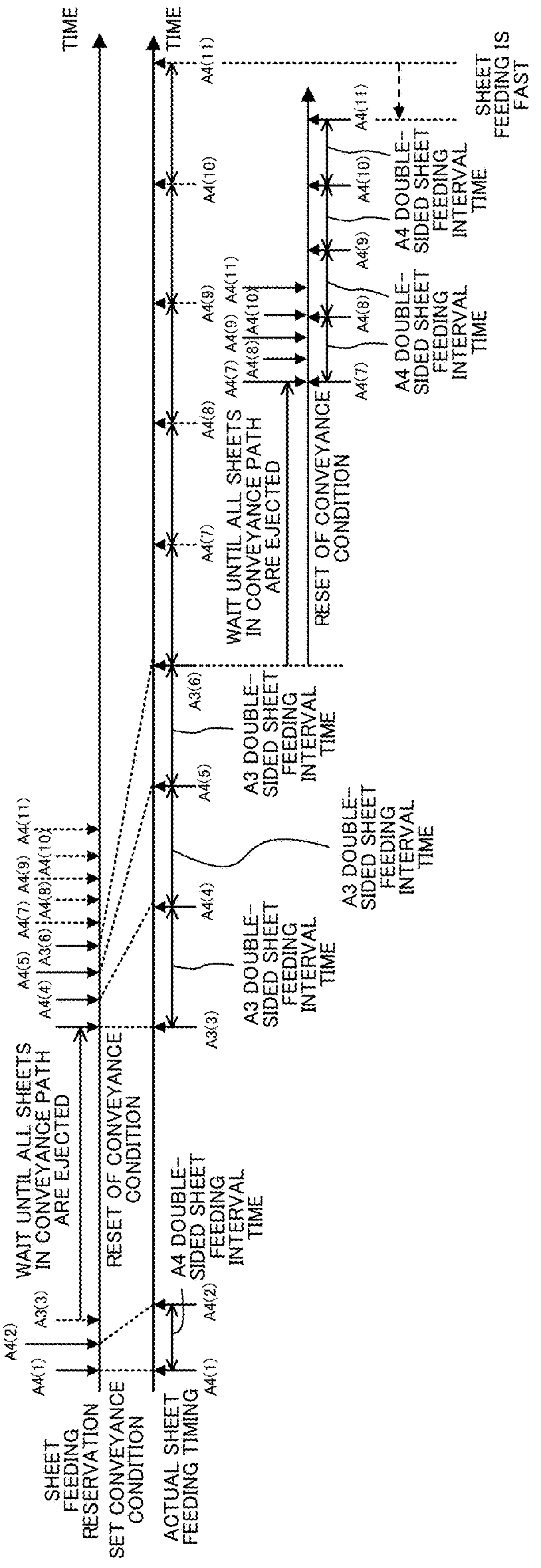
FIG. 6 is a diagram for explaining a sheet feeding start time according to the embodiment.

The example of FIG. 6 is an example in which, after the six sheets P of FIGS. 5A and 5B, double-sided printing is performed on seventh to eleventh A4 size sheets P (A4(7) to A4(11)) having a shorter sheet length than that of the sixth A3 size sheet P (A3(6)). In the example of FIG. 6, the sheet feeding start time of the eleventh sheet P (A4(11)), which is the last sheet P, becomes earlier in the case of feeding the seventh to eleventh sheet P (A4(7) to A4(11)) at the sheet feeding interval of A4 size after waiting until all the sheets P in the conveyance path R are ejected (productivity B), as compared with the case of performing the sheet feeding reservation of the seventh sheet P (A4(7)) immediately at the stage of the downward dotted arrow and feeding the seventh sheet P (A4(7)) at the sheet feeding interval of A3 size (productivity A).

In the examples of FIGS. 5A to 6, the case where double-sided printing is performed on all the sheets P has been described. However, for example, in a case where sheets P (an example of a single-sided processing medium) on which printing (processing) is performed only on one side are mixed in a plurality of sheets P (an example of a double-sided processing medium) of the seventh to eleventh sheet on which printing (processing) is performed on both sides (for example, it is assumed that single-sided printing is performed only on the ninth sheet P), after the double-sided printing of the preceding eight sheets P on which printing is performed on both sides is completed, the subsequent ninth sheet P may be conveyed in the processing path R1 to maintain the conveyance speed in the conveyance path R and not to be conveyed to the circulation path R2. In this case, the sheet feeding start time of the ninth sheet P may be before the eighth sheet P is ejected from the conveyance path R as long as single-sided printing of the ninth sheet P is performed after back-side printing of the eighth sheet P is performed. Furthermore, for the sheet P on which printing is performed on both sides of the tenth sheet, for example, it is only required to perform sheet feeding at the sheet feeding interval in the case of single-sided printing after feeding the ninth sheet P.

In the present embodiment, the conveyance condition to be adjusted includes both the sheet feeding start time of the external sheet feeding unit 10 or the internal sheet feeding unit 20 and the conveyance speed of the conveyance path R (the circulation path R2 of the constant velocity conveyance unit 33 or the like), but the conveyance condition to be adjusted may include at least one of the sheet feeding start time and the conveyance speed. For example, it can be said that the conveyance condition is adjusted in both a case where the sheet feeding interval is constant and the conveyance speed is adjusted, and a case where the conveyance speed is constant and the sheet feeding interval is adjusted. Further, the conveyance condition can also be adjusted by, for example, the remaining amount of the rear end of the sheet P to protrude from the reverse path R2*a* when the reverse conveyance unit 34 switches back, the stop time of the sheet P at the time of switching back, the slack amount at the time of abutting the sheet P against the registration roller pair 31, the low abutting speed, the period in which the abutting speed is maintained, and the like.

Furthermore, in the present embodiment, the flowchart of the sheet feeding reservation processing of FIG. 3 and the flowchart of the sheet feeding processing of FIG. 4 have been described as separate processing, but the sheet feeding processing of FIG. 4 may be performed at the stage of the sheet feeding reservation processing of FIG. 3. For example, the processing of steps S21 to S27 of FIG. 4 may be performed instead of the processing of step S11 of FIG. 3, and the conveyance condition may be maintained as in step S11 of FIG. 3 when it is determined NO in step S21 or S24 of FIG. 4.

In addition, in the present embodiment, in steps S22 and S23 of FIG. 4 in a case where the sheet length of the subsequent sheet P is shorter than the double-sided conveyance length (for example, the sheet length of the preceding sheet P), an example has been described in which, for example, the sheet feeding start time of the last sheet P for which sheet feeding has been reserved is calculated as the sheet feeding start time in a case where at least a plurality of subsequent sheets P is conveyed and the productivity A and B are compared. However, not only the comparison result of the sheet feeding start time but also, for example, a low conveyance speed and a low noise may be considered as one of the conditions of high productivity. In addition, in a case where the plurality of sheets P for which sheet feeding has been reserved includes the sheet P having a long sheet length again, it is necessary to change the conveyance condition to a conveyance condition suitable for the sheet P having a short sheet length and then change the conveyance condition to a conveyance condition suitable for the sheet P having a long sheet length again. Therefore, it is preferable to consider the standby time in which all the preceding sheets P are ejected from the conveyance path R twice. In addition, the conveyance condition may be reset (step S27) without performing the calculation of the productivity A and B each time, for example, the productivity B is determined to be higher than the productivity A (step S24: YES) on the basis of a condition for predetermined sheet type and sheet number such that the preceding A3 size sheet P is followed by a specified number of the subsequent A4 size sheet P (for example, three or four sheets).

In the present embodiment described above, the printing apparatus 1 including the conveyance device includes the external sheet feeding unit 10 and the internal sheet feeding unit 20 (an example of the feeder), the conveyor (for example, the registration roller pair 31, the acceleration conveyance unit 32, the constant velocity conveyance unit 33, the reverse conveyance unit 34, the re-feeding unit 35, the sheet ejection conveyance unit 36, and the straight conveyance unit 37), and the control unit 81 (an example of a processor). The external sheet feeding unit 10 and the internal sheet feeding unit 20 feed a sheet P (an example of a medium). The conveyance unit conveys the sheet P in a conveyance path R including a processing path R1 for conveying the sheet P to a printing unit 40 (an example of a processing unit) that performs printing (an example of processing) on the sheet P and a circulation path R2 for reversing the sheet P that has passed through the printing unit 40 and conveying the sheet P to the printing unit 40 again. The control unit 81 adjusts the conveyance condition including at least one of the feed start time of the sheet P by the external sheet feeding unit 10 or the internal sheet feeding unit 20 and the conveyance speed of the sheet P by the conveyance unit in the conveyance path R based on the length of the sheet P in the conveyance direction. In addition, the control unit 81 adjusts the conveyance condition on the basis of the fact that the subsequent sheet P (for example, the third A3 size sheet P (A3(3))) conveyed to the circulation path R2 has a longer length in the conveyance direction than the preceding sheet P (for example, a second A4 size sheet P (A4(2))) conveyed to the circulation path R2, and maintains the conveyance condition of the preceding sheet P on the basis of the fact that the subsequent sheet P (for example, the fourth A4 size sheet P (A4(4))) has a shorter length in the conveyance direction than the preceding sheet P (for example, the third A3 size sheet P (A3(3))).

In the related art, when a process such as printing is performed on both sides of the sheet P, the sheet P is reversed in the circulation path R2, and the single-sided printed sheet P and the unprinted sheet P are alternately sent to the printing unit 40, for example. Therefore, the sheet feeding timing of the sheet P in the external sheet feeding unit 10 and the internal sheet feeding unit 20, the conveyance speed of the sheet P in the circulation path R2, the number of sheets P conveyed inside the printing apparatus 1, and the like vary according to the sheet length (length in the conveyance direction) of the sheet P. Therefore, in the related art, in a case where a sheet P having a sheet length different from that of the preceding sheet P is fed, the conveyance condition is reset, and the subsequent sheet P is fed after all the preceding sheets P are ejected from the conveyance path R. On the other hand, in the present embodiment, when the subsequent sheet P (for example, the fourth A4 size sheet P (A4(4))) is shorter in length in the conveyance direction than the preceding sheet P (for example, the third A3 size sheet P (A3(3))), the conveyance condition of the preceding sheet P is maintained, and sheet feeding is performed. Therefore, when the sheet length of the subsequent sheet P becomes short, it is possible to avoid a process of waiting for all the preceding sheets P to be discharged from the conveyance path R. Therefore, according to the present embodiment, the conveyance efficiency of the conveyance device that conveys the sheet P in the conveyance path R including the circulation path R2 can be improved. As an example, double-sided printing of five copies of five sheets P of A4 size and one sheet P of A3 size, that is, a total of 30 sheets, was performed according to the process of FIG. 5B of the present embodiment, such that double-sided printing of all the remaining sheets P was performed at a sheet feeding interval (conveyance condition) of A3 size from the sixth A3 size sheet P. As a result, printing of 43 sheets per minute was completed. On the other hand, as in the comparative example of FIG. 5A, when the ejection standby of the preceding sheet P from the inside of the conveyance path R and the resetting of the sheet feeding interval were performed at all timings when the sheet length was changed, printing of only 30 sheets per minute was completed.

Furthermore, in the present embodiment, the control unit 81 maintains the conveyance condition of the preceding sheet P on the basis of the length of the subsequent sheet P in the conveyance direction being shorter than that of the preceding sheet P, and the comparison result between the feed start time when the plurality of subsequent sheets P are conveyed under the conveyance condition of the preceding sheet P and the feed start time when the plurality of subsequent sheets P are conveyed under the conveyance condition of the subsequent sheet P.

Therefore, even in a case where the subsequent sheet P (for example, a seventh sheet of A4 size sheet P (A4(7))) is shorter in length in the conveyance direction than the preceding sheet P (for example, the sixth A3 size sheet P (A3(6))), when feeding of the subsequent sheet P having a constant sheet length is continuously performed and feeding is performed at the sheet feeding interval of the preceding sheet P having a long sheet length, the conveyance condition can be reset in a case where the sheet feeding start time (feed start time) is delayed. Therefore, the conveyance efficiency can be further increased.

Furthermore, in the present embodiment, in a case where a single-sided processing medium that is a sheet P on which printing is performed on one side is mixed in a plurality of double-sided processing media that are sheets P on which printing is performed on both sides, the control unit 81 maintains the conveyance speed and conveys the subsequent single-sided processing medium in the processing path R1 not to convey the subsequent single-sided processing medium to the circulation path R2 after the processing of both sides of the preceding double-sided processing medium is completed.

Thus, when the single-sided processing medium is mixed in the double-sided processing medium, it is possible to avoid changing the conveyance speed or the like according to the single-sided processing medium. Therefore, it is possible to avoid a process of waiting for all the single-sided processing medium to be discharged from the conveyance path R and to further increase the conveyance efficiency.

The present invention is not limited to the above-described embodiment as it is, and the constituent elements can be modified and embodied without departing from the gist thereof at the implementation stage. Furthermore, various inventions can be formed by appropriately combining a plurality of constituent elements disclosed in the embodiment. For example, all the constituent elements shown in the embodiment may be appropriately combined. It is a matter of course that various modifications and applications can be made without departing from the gist of the invention. Hereinafter, some inventions described in the specification and drawings of the present application will be additionally described.

According to an aspect, a conveyance device includes a feeder that feeds a medium, a conveyor that conveys the medium in a conveyance path including a processing path for conveying the medium to a processing unit that performs processing on the medium and a circulation path for reversing the medium that has passed through the processing unit and conveying the medium to the processing unit again, and a processor that adjusts a conveyance condition including at least one of a feed start time of the medium by the feeder and a conveyance speed of the medium by the conveyor in the conveyance path based on a length of the medium in the conveyance direction, wherein the processor adjusts the conveyance condition on the basis of a fact that a length of the succeeding medium conveyed to the circulation path in the conveyance direction is longer than that of the preceding medium conveyed to the circulation path, and maintains the conveyance condition of the preceding medium on the basis of a fact that the length of the succeeding medium in the conveyance direction is shorter than that of the preceding medium.

According to another aspect, the processor maintains the conveyance condition of the preceding medium on the basis of a fact that a length of the subsequent medium in the conveyance direction is shorter than a length of the preceding medium in the conveyance direction, and a result of comparison between the feed start time in a case where a plurality of the subsequent media is conveyed under the conveyance condition of the preceding medium and the feed start time in a case where the plurality of subsequent media is conveyed under the conveyance condition of the subsequent medium.

According to another aspect, when a single-sided processing medium, which is the medium on which the processing is performed on one side, is mixed in a plurality of double-sided processing media, which are the media on which the processing is performed on both sides, the processor maintains the conveyance speed and conveys the subsequent single-sided processing medium in the processing path not to convey the subsequent single-sided processing medium to the circulation path after the processing on both sides of the preceding double-sided processing medium is completed.

According to another aspect, a processing device includes a feeder that feeds a medium, a processing unit that performs processing on the medium; a conveyor that conveys the medium in a conveyance path including a processing path for conveying the medium to the processing unit and a circulation path for reversing the medium having passed through the processing unit and conveying the medium to the processing unit again; and a processor that adjusts a conveyance condition including at least one of a feed start time of the medium by the feeder and a conveyance speed of the medium by the conveyor in the conveyance path based on a length of the medium in the conveyance direction, wherein the processor adjusts the conveyance condition on the basis of a fact that a length of the succeeding medium conveyed to the circulation path in the conveyance direction is longer than that of the preceding medium conveyed to the circulation path, and maintains the conveyance condition of the preceding medium on the basis of a fact that the length of the succeeding medium in the conveyance direction is shorter than that of the preceding medium.

According to another aspect, a printing apparatus includes a feeder that feeds a medium, a printing unit that performs printing on the medium, a conveyor that conveys the medium in a conveyance path including a printing path for conveying the medium to the printing unit and a circulation path for reversing the medium that has passed through the printing unit and conveying the medium to the printing unit again; and a processor that adjusts a conveyance condition including at least one of a feed start time of the medium by the feeder and a conveyance speed of the medium by the conveyor in the conveyance path based on a length of the medium in the conveyance direction, wherein the processor adjusts the conveyance condition on the basis of a fact that a length of the succeeding medium conveyed to the circulation path in the conveyance direction is longer than that of the preceding medium conveyed to the circulation path, and maintains the conveyance condition of the preceding medium on the basis of a fact that the length of the succeeding medium in the conveyance direction is shorter than that of the preceding medium.

What is claimed is:

1. A conveyance device comprising:

a feeder that feeds a medium;

a conveyor that conveys the medium in a conveyance path including a processing path for conveying the medium to a processing unit that performs processing on the medium and a circulation path for reversing the medium that has passed through the processing unit and conveying the medium to the processing unit again; and a processor that adjusts a conveyance condition including at least one of a feed start time of the medium by the feeder and a conveyance speed of the medium by the conveyor in the conveyance path based on a length of the medium in the conveyance direction, wherein the processor adjusts the conveyance condition, after all the preceding media have been ejected from the conveyance path, on the basis of a fact that a length of the succeeding medium conveyed to the circulation path in the conveyance direction is longer than that of the preceding medium conveyed to the circulation path, and maintains the conveyance condition of the preceding medium on the basis of a fact that the length of the succeeding medium in the conveyance direction is shorter than that of the preceding medium.

2. A conveyance device comprising:

a feeder that feeds a medium;

a conveyor that conveys the medium in a conveyance path including a processing path for conveying the medium to a processing unit that performs processing on the medium and a circulation path for reversing the medium that has passed through the processing unit and conveying the medium to the processing unit again; and a processor that adjusts a conveyance condition including at least one of a feed start time of the medium by the feeder and a conveyance speed of the medium by the conveyor in the conveyance path based on a length of the medium in the conveyance direction, wherein the processor adjusts the conveyance condition on the basis of a fact that a length of the succeeding medium conveyed to the circulation path in the conveyance direction is longer than that of the preceding medium conveyed to the circulation path, and maintains the conveyance condition of the preceding medium on the basis of a fact that a length of the subsequent medium in the conveyance direction is shorter than a length of the preceding medium in the conveyance direction, and a result of comparison between the feed start time in a case where a plurality of the subsequent media is conveyed under the conveyance condition of the preceding medium and the feed start time in a case where the plurality of subsequent media is conveyed under the conveyance condition of the subsequent medium.

3. A conveyance device comprising:

a feeder that feeds a medium;

a conveyor that conveys the medium in a conveyance path including a processing path for conveying the medium to a processing unit that performs processing on the medium and a circulation path for reversing the medium that has passed through the processing unit and conveying the medium to the processing unit again; and a processor that adjusts a conveyance condition including at least one of a feed start time of the medium by the feeder and a conveyance speed of the medium by the conveyor in the conveyance path based on a length of the medium in the conveyance direction, wherein the processor adjusts the conveyance condition on the basis of a fact that a length of the succeeding medium conveyed to the circulation path in the conveyance direction is longer than that of the preceding medium conveyed to the circulation path, and maintains the conveyance condition of the preceding medium on the basis of a fact that the length of the succeeding medium in the conveyance direction is shorter than that of the preceding medium and when a single-sided processing medium, which is the medium on which the processing is performed on one side, is mixed in a plurality of double-sided processing media, which are the media on which the processing is performed on both sides, the processor maintains the conveyance speed and conveys the subsequent single-sided processing medium in the processing path, without conveying the subsequent single-sided processing medium to the circulation path, after the processing on both sides of the preceding double-sided processing medium is completed.

* * * * *